United States Patent [19]
Arakawa et al.

[11] Patent Number: 5,801,391
[45] Date of Patent: Sep. 1, 1998

[54] RADIATION IMAGE READ-OUT APPARATUS

[75] Inventors: Satoshi Arakawa; Hiroaki Yasuda, both of Kanagawa-ken, Japan

[73] Assignee: Fuji Photo Film Co., Ltd., Kanagawa-Ken, Japan

[21] Appl. No.: 756,912

[22] Filed: Nov. 26, 1996

[30] Foreign Application Priority Data

Dec. 1, 1995 [JP] Japan ................. 7-314221

[51] Int. Cl.$^6$ ................. G03B 42/02
[52] U.S. Cl. ................. 250/584; 250/581
[58] Field of Search ................. 250/584, 581

[56] References Cited

U.S. PATENT DOCUMENTS

| | | |
|---|---|---|
| 4,368,384 | 1/1983 | Kato et al. . |
| 4,780,611 | 10/1988 | Nakamura ................. 250/581 |
| 5,006,708 | 4/1991 | Itoh et al. . |
| 5,051,589 | 9/1991 | Arakawa . |

FOREIGN PATENT DOCUMENTS

| | | | |
|---|---|---|---|
| 0 148 410 A1 | 7/1985 | European Pat. Off. ........ 250/584 | |
| 63-261341 (A) | 10/1988 | Japan ................. 250/584 | |
| 1-262454 | 10/1989 | Japan . | |

*Primary Examiner*—Constantine Hannaher
*Attorney, Agent, or Firm*—Sughrue, Mion, Zinn, Macpeak & Seas, PLLC

[57] ABSTRACT

In a radiation image read-out apparatus, a stimulable phosphor sheet, on which a radiation image of an object has been stored, is scanned with a laser beam of a predetermined output power, which causes the stimulable phosphor sheet to emit light in proportion to the amount of energy stored thereon during its exposure to radiation, and the emitted light is photoelectrically detected with a predetermined sampling time. A response speed r [sec] of the stimulable phosphor constituting the stimulable phosphor sheet, the laser beam output power p [W], a picture element size s [m], and the sampling time t [sec] are set such that they may satisfy Formulas (1), (2), and (3):

$$r/(s \cdot t) < 5,000 \quad (1)$$

$$t/s^2 < 80 \quad (2)$$

$$p \cdot t/s^2 > 1 \quad (3)$$

The radiation image having been stored on the stimulable phosphor sheet is thereby read out quickly and such that a reproduced image having good image quality may be obtained.

6 Claims, 3 Drawing Sheets

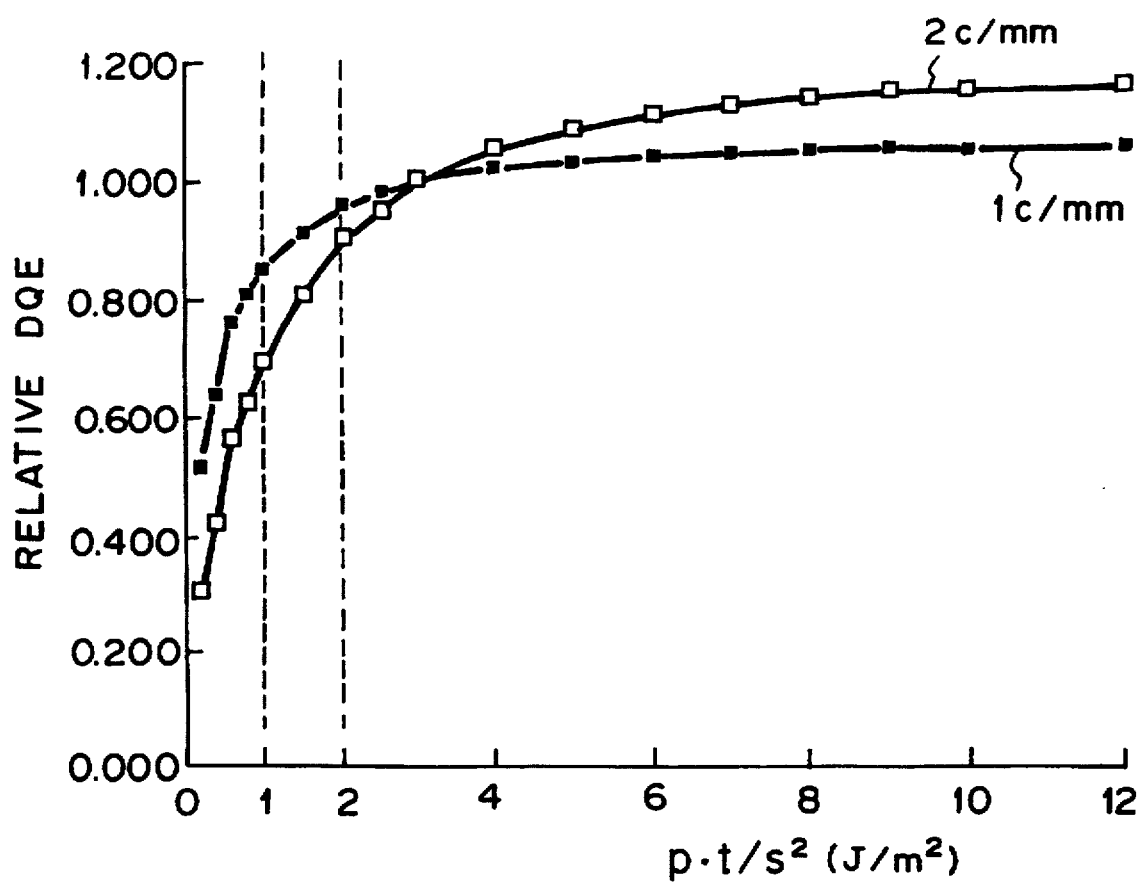

0
RADIATION IMAGE READ-OUT APPARATUS

BACKGROUND OF THE INVENTION

1. Field of the Invention

This invention relates to a radiation image read-out apparatus using a stimulable phosphor sheet, wherein a radiation image is read out from the stimulable phosphor sheet, on which the radiation image has been stored.

2. Description of the Prior Art

Techniques for photoelectrically reading out a radiation image, which has been recorded on a photographic film, in order to obtain an image signal, carrying out appropriate image processing on the image signal, and then reproducing a visible image by use of the processed image signal have heretofore been known in various fields.

Also, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material, such as photographic material, or on a display device, such as a cathode ray tube (CRT) display device. Radiation image recording and reproducing systems, which use stimulable phosphor sheets, are advantageous over conventional radiography using silver halide photographic materials, in that images can be recorded even when the energy intensity of the radiation, to which the stimulable phosphor sheet is exposed, varies over a wide range. One example of the radiation image recording and reproducing systems is disclosed in U.S. Pat. No. 4,239,968.

In the radiation image recording and reproducing systems, in cases where, for example, a large number of radiation images are processed, it has heretofore been required that the radiation images can be read out quickly from the stimulable phosphor sheets such that reproduced images having good image quality may be obtained.

In order for a radiation image to be read out quickly from a stimulable phosphor sheet, the speed, with which the stimulable phosphor sheet is scanned with the stimulating rays, may be set to be high. However, in such cases, the image quality of the image cannot be kept good. Specifically, in order for the image quality to be kept good, it is necessary that a large amount of light can be emitted from the stimulable phosphor sheet when the stimulable phosphor sheet is stimulated by the stimulating rays. However, a certain length of rise time is required between when the exposure of the stimulable phosphor sheet to the stimulating rays is begun and when the emission of light from the stimulable phosphor sheet is begun, and a certain length of fall time is required when the emission of light from the stimulable phosphor sheet is finished. Also, in order for the light emitted from the stimulable phosphor sheet to be detected sufficiently, the scanning speed should be set to be slow, and the total sum of the amount of light received by the photoelectric conversion means should thereby be kept large. Therefore, it was difficult to satisfy the two incompatible requirements with regard to the quick image readout and good image quality.

SUMMARY OF THE INVENTION

The primary object of the present invention is to provide a radiation image read-out apparatus, wherein conditional formulas defining relationship among a response speed of a stimulable phosphor constituting a stimulable phosphor sheet, a laser beam output power, a picture element size, and a sampling time are set, and a radiation image having been stored on the stimulable phosphor sheet is thereby read out quickly and such that a reproduced image having good image quality may be obtained.

In a radiation image read-out apparatus in accordance with the present invention, the response speed of the stimulable phosphor constituting a stimulable phosphor sheet, the laser beam output power, the picture element size, and the sampling time are set in accordance with specific conditional formulas, and a radiation image having been stored on the stimulable phosphor sheet is thereby read out quickly and such that a reproduced image having good image quality may be obtained, while the balance of the performance of the respective devices constituting the radiation image read-out apparatus is being kept good.

Specifically, the present invention provides a radiation image read-out apparatus for scanning a stimulable phosphor sheet, on which a radiation image of an object has been stored, with a laser beam of a predetermined output power, which causes the stimulable phosphor sheet to emit light in proportion to the amount of energy stored thereon during its exposure to radiation, and photoelectrically detecting the emitted light with a predetermined sampling time, wherein a response speed r [sec] of the stimulable phosphor constituting the stimulable phosphor sheet, the laser beam output power p [W], a picture element size s [m], and the sampling time t [sec] satisfy Formulas (1), (2), and (3):

$$r/(s \cdot t) < 5{,}000 \tag{1}$$

$$t/s^2 < 80 \tag{2}$$

$$p \cdot t/s^2 > 1 \tag{3}$$

Such that the image readout can be carried out quickly, the right side of Formula (1) should preferably be set to be 2,500. Specifically, in lieu of Formula (1), Formula (1') shown below should preferably be satisfied.

$$r/(s \cdot t) < 2{,}500 \tag{1'}$$

Also, such that the image readout can be carried out quickly, the right side of Formula (2) should preferably be set to be 40. Specifically, in lieu of Formula (2), Formula (2') shown below should preferably be satisfied.

$$t/s^2 < 40 \tag{2'}$$

Further, such that the image readout can be carried out quickly, the right side of Formula (3) should preferably be set to be 2. Specifically, in lieu of Formula (3), Formula (3') shown below should preferably be satisfied.

$$p \cdot t/s^2 > 2 \tag{3'}$$

By way of example, the response speed of the stimulable phosphor may be set to be $50 \times 10^{-9}$ [sec], and the laser beam output power may be set to be 0.2 to 1.0 [W]. Also, the picture element size may be set to be $100\times10^{-6}$ [m], and the sampling time may be set to be $0.2\times10^{-6}$ to $0.5\times10^{-6}$ [sec].

The response speed of the stimulable phosphor should preferably be at most $200\times10^{-9}$ [sec]. For example, a cerium activated phosphor should preferably be employed as the stimulable phosphor.

As the cerium activated phosphor, one of the cerium activated phosphors proposed in, for example, U.S. Pat. No. 4,239,968 and Japanese Patent Application No. 4(1992)-276540 may be employed. For example, the cerium activated phosphor represented by the formula MeFX:Ce is preferable, wherein Me represents at least one of barium (Ba), strontium (Sr), calcium (Ca), and magnesium (Mg), and X represents at least one of bromine (Br), iodine (I), and chlorine (Cl).

The term "picture element size s" as used herein means the value obtained by dividing the scanning width along each of the main scanning direction and the sub-scanning direction by the number of picture elements. Therefore, the picture element size does not necessarily coincide with the beam diameter of the laser beam, which serves as the scanning light.

As the laser for producing the laser beam, a semiconductor-pumped solid laser, an SHG laser, an MOPA laser (supplied by SDL Co.), a semiconductor laser beam combining light source, or the like, may be employed.

With the radiation image read-out apparatus in accordance with the present invention, the amount of light emitted by the stimulable phosphor sheet is increased, and an image having good image quality is obtained. Also, the response speed r [sec] of the stimulable phosphor constituting the stimulable phosphor sheet, the picture element size s [m], and the sampling time t [sec] are set in accordance with the laser beam output power p [W] such that they may satisfy Formulas (1), (2), and (3) shown below. In this manner, the scanning for the image readout can be carried out quickly.

$$r/(s\cdot t)<5,000 \quad (1)$$

$$t/s^2<80 \quad (2)$$

$$p\cdot t/s^2>1 \quad (3)$$

As described above, with the radiation image read-out apparatus in accordance with the present invention, the amount of energy given by the stimulating rays to the stimulable phosphor sheet is increased such that an image having good image quality can be obtained. Also, the stimulable phosphor having a high response speed is employed, and the picture element size and the sampling time are adjusted. In this manner, the image readout can be carried out quickly.

BRIEF DESCRIPTION OF THE DRAWINGS

FIG. 3 is a graph showing a relative value of the detective quantum efficiency (DQE) of an image corresponding to a value of $p\cdot t/s^2$ in Formula (3), which relative DQE is obtained when the frequency of an image is set at 1 c/mm and 2 c/mm.

DESCRIPTION OF THE PREFERRED EMBODIMENTS

The present invention will hereinbelow be described in further detail with reference to the accompanying drawings.

Figure 1:
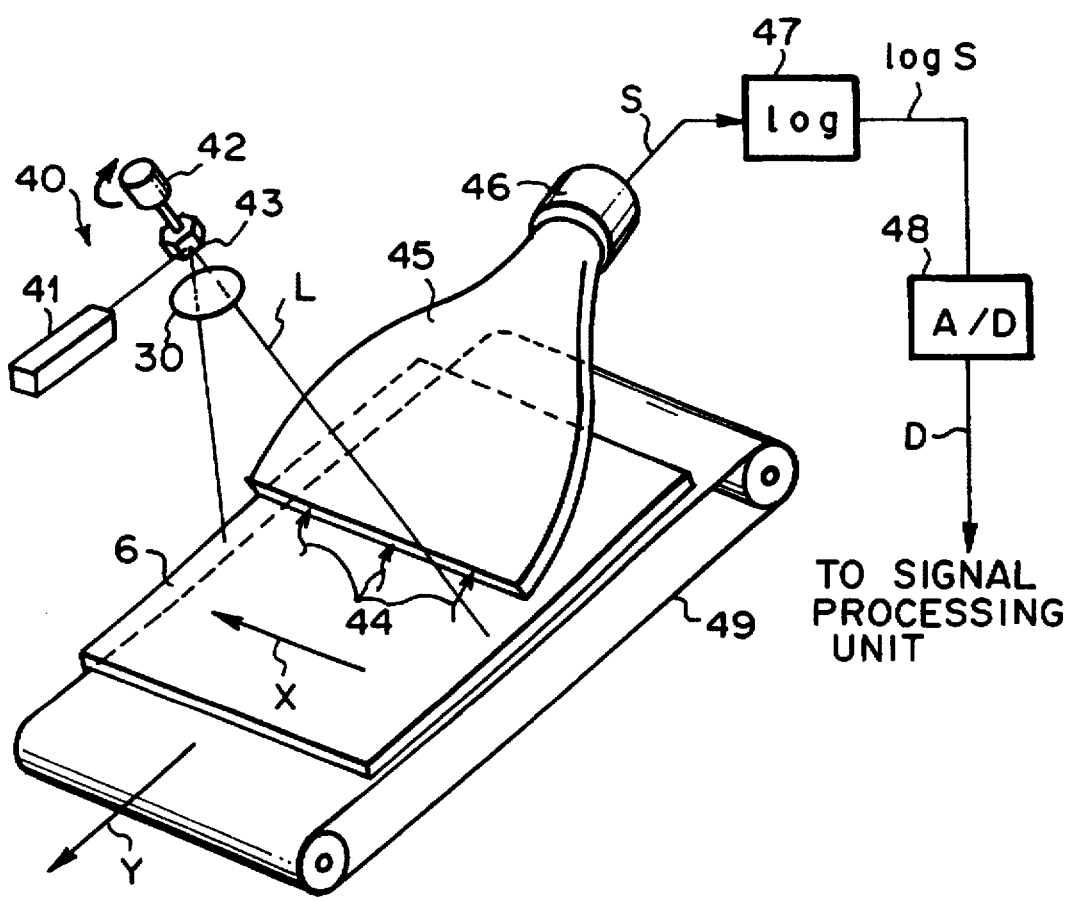
FIG. 1 is a perspective view showing an embodiment of the radiation image read-out apparatus in accordance with the present invention.

FIG. 1 is a perspective view showing an embodiment of the radiation image read-out apparatus in accordance with the present invention. In the radiation image read-out apparatus shown in FIG. 1, a stimulable phosphor sheet (hereinafter simply referred to as the sheet) 6, on which a radiation image has been stored, is placed on an endless belt 49, which is rotated by a motor (not shown). A laser beam source 41, a rotating polygon mirror 43, a motor 42, and a scanning lens 30 are located above the stimulable phosphor sheet 6. The laser beam source 41 produces a laser beam L of an output power p [W], which causes the sheet 6 to emit light in proportion to the amount of energy stored thereon during its exposure to the radiation. The rotating polygon mirror 43 reflects and deflects the laser beam L, which has been produced by the laser beam source 41. The motor 42 rotates the rotating polygon mirror 43. The scanning lens 30 converges the laser beam L, which has been reflected and deflected by the rotating polygon mirror 43, on the sheet 6. Also, the scanning lens 30 serves such that the laser beam L may scan the sheet 6 at uniform speed and in the main scanning direction, which is indicated by the arrow X.

A light guide member 45 is located above and close to the position on the sheet 6 which is being scanned with the laser beam L. The light guide member 45 collects light 44, which is emitted from the upper surface of the sheet 6 when the sheet 6 is scanned with the laser beam L, from above the sheet 6. The light guide member 45 is located such that it may be in close contact with a photomultiplier 46, which photoelectrically detects the light 44 having been emitted by the sheet 6 and generates an analog signal S.

The photomultiplier 46 is connected to a logarithmic amplifier 47. The logarithmic amplifier 47 is connected to an analog-to-digital converting circuit (hereinafter referred to as the A/D converting circuit) 48. In the A/D converting circuit 48, the analog signal log S, which has been obtained from the logarithmic amplifier 47, is converted into a digital signal D with a sampling time t [sec].

The digital signal D having been obtained from the A/D converting circuit 48 is fed into a signal processing unit, such as an external image processing unit, which is connected to the A/D converting circuit 48.

In this embodiment, the picture element size is set to be s [m]. Also, as the stimulable phosphor sheet 6 used in this embodiment, a stimulable phosphor sheet constituted of a stimulable phosphor having a response speed of r [sec] is employed.

The response speed r of the stimulable phosphor, the laser beam output power p, the picture element size s, and the sampling time t are set such that they may satisfy Formulas (1), (2), and (3) shown below.

$$r/(s\cdot t)<5,000 \quad (1)$$

$$t/s^2<80 \quad (2)$$

$$p\cdot t/s^2>1 \quad (3)$$

How this embodiment operates will be described hereinbelow.

The sheet 6, on which the radiation image has been stored, is set at a predetermined position on the endless belt 49. The sheet 6, which has been set at the predetermined position, is conveyed by the endless belt 49 in a sub-scanning direction indicated by the arrow Y.

Also, the laser beam L of the output power p is produced by the laser beam source 41. The laser beam L, which has been produced by the laser beam source 41, is reflected and deflected by the rotating polygon mirror 43, which is quickly rotated by the motor 42 in the direction indicated by the arrow. The laser beam L, which has thus been reflected and deflected by the rotating polygon mirror 43, is converged on the surface of the sheet 6 by the scanning lens 30. Also, the laser beam L is caused to scan the sheet 6 at uniform speed and in the main scanning direction indicated by the arrow X. The main scanning direction is approximately normal to the sub-scanning direction indicated by the arrow Y. By the main scanning of the laser beam L and the sub-scanning of the sheet 6, the entire area of the sheet 6 is exposed to the laser beam L.

When the sheet 6 is exposed to the laser beam L, the stimulable phosphor of the sheet 6 is stimulated by the laser beam L and emits light 44 in proportion to the amount of energy stored thereon during its exposure to the radiation. The light 44 is emitted by the sheet 6 with the response speed r [sec].

The light 44, which has been emitted by the sheet 6, is guided by the light guide member 45, which is located close to the upper surface of the sheet 6, to the photomultiplier 46. The emitted light 44, which has thus been guided by the light guide member 45, is photoelectrically detected by the photomultiplier 46. The light guide member 45 is made from a light guiding material, such as an acrylic plate. The light guide member 45 has a linear input end face, which is located such that it may extend along the main scanning line on the stimulable phosphor sheet 6, and a ring-like output end face, which is located such that it may be in close contact with a light receiving face of the photomultiplier 46. The emitted light 44, which has entered from the input end face into the light guide member 45, is guided through repeated total reflection inside of the light guide member 45, emanates from the output end face, and is received by the photomultiplier 46. The amount of the emitted light 44 representing the radiation image is converted by the photomultiplier 46 into the analog signal S.

The analog signal S having been generated by the photomultiplier 46 is logarithmically amplified by the logarithmic amplifier 47, and the analog signal log S is thereby obtained.

The analog signal log S is then fed into the A/D converting circuit 48. The A/D converting circuit 48 converts the analog signal log S into the digital signal D with the sampling time t [sec] and in synchronization with the scanning of the laser beam L. The digital signal D is fed into the signal processing unit.

As described above, the response speed r of the stimulable phosphor, the laser beam output power p, the picture element size s, and the sampling time t are set such that they may satisfy Formulas (1), (2), and (3) shown above. Specifically, the response speed r of the stimulable phosphor is high, and the sampling time t is short. Therefore, the sheet 6 can be scanned quickly, and the radiation image can thereby be read out quickly. Also, since the laser beam output power p is set to be high, a large amount of light can be emitted by the sheet 6, and an image having good image quality can be obtained.

As for the portion of the sheet 6, from which the image information has already been detected, even if the image information is being read out from the other region of the sheet 6, erasing light may be irradiated to the portion of the sheet 6 in order to release energy remaining on the sheet 6, such that the erasing light may not impinge upon the light guide member 45.

The present invention will further be illustrated by the following experimental example, in which the response speed r of the stimulable phosphor, the laser beam output power p, the picture element size s, and the sampling time t satisfy Formulas (1), (2), and (3).

EXPERIMENTAL EXAMPLE

Figure 2:
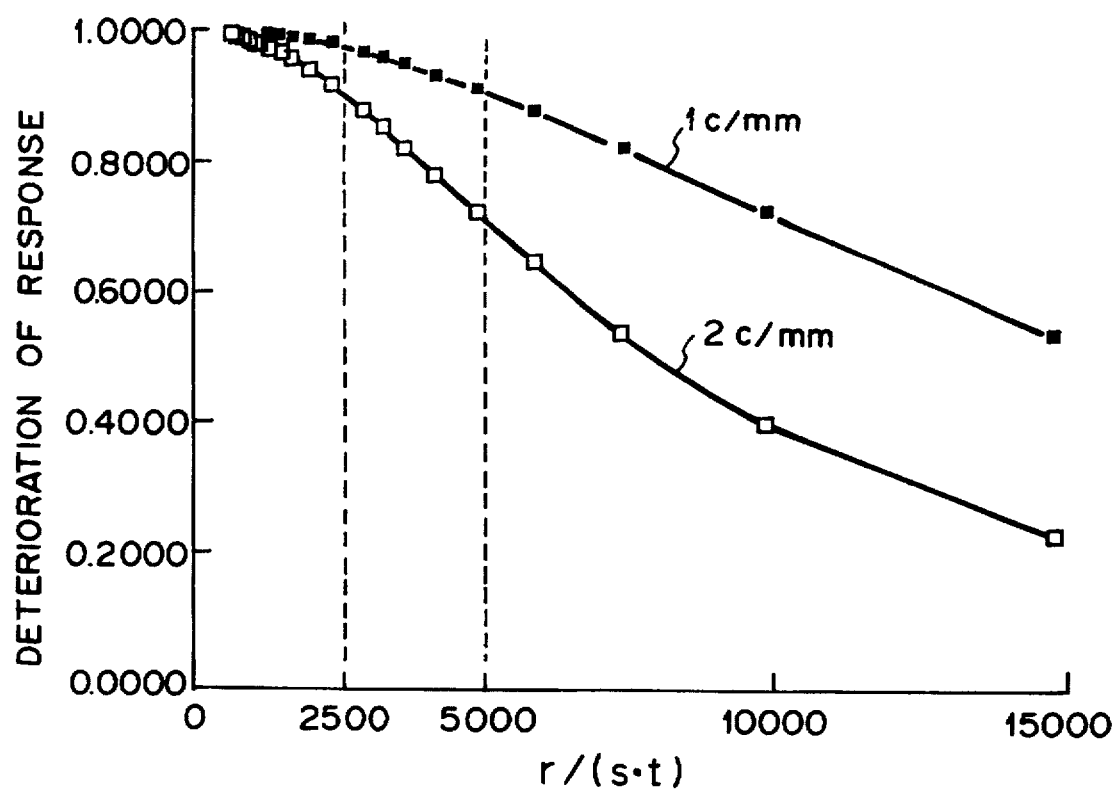
FIG. 2 is a graph showing deterioration of the response corresponding to a value of $r/(s\cdot t)$ in Formula (1), deterioration occurs when the frequency of an image is set at 1 c/mm and 2 c/mm.

FIG. 2 is a graph showing deterioration of the response corresponding to the value of r/(s·t) in Formula (1), which deterioration occurs when the frequency of an image is set at 1 c/mm and 2 c/mm. Deterioration of the response represents the factor for attenuating the modulation transfer function (MTF).

In general, a response reduction of approximately 20% can be clearly discriminated by the visual characteristics. Therefore, in cases where the level of the response before being deteriorated is taken as 1, the level of the response after being deteriorated should preferably be at least 80% (i.e., the attenuation should preferably be at most 20%).

As illustrated in FIG. 2, such that the level of the response after being deteriorated may be at least approximately 0.8, the value of r/(s·t) in Formula (1) should be smaller than 5,000, and should preferably be smaller than 2,500. Specifically, the formula shown below should be satisfied.

$$r/(s \cdot t) < 5,000 \qquad (1)$$

Also, the formula shown below should preferably be satisfied.

$$r/(s \cdot t) < 2,500 \qquad (1')$$

FIG. 3 is a graph showing the signal-to-noise ratio (in a strict sense, the relative DQE) of an image corresponding to the value of p·t·s² in Formula (3), which relative DQE is obtained when the frequency of an image is set at 1 c/mm and 2 c/mm. The term "relative DQE" as used herein means the relative value of the detective quantum efficiency (DQE). The relative DQE corresponds to the square of the signal-to-noise ratio of the image, i.e. $(S/N)^2$. The relative DQE of the image should preferably be at least approximately 80%.

As illustrated in FIG. 3, such that the relative DQE may be at least approximately 0.8, the value of $p \cdot t/s^2$ should be larger than 1, and should preferably be larger than 2. Specifically, the formula shown below should be satisfied.

$$p \cdot t/s^2 > 1 \qquad (3)$$

Also, the formula shown below should preferably be satisfied.

$$p \cdot t/s^2 > 2 \qquad (3')$$

Table 1 shown below lists the image read-out time corresponding to the value of $t/s^2$ in Formula (2). As for the image having the 14"×17" size, the read-out time should preferably be at most 20 seconds.

TABLE 1

| $t/s^2$ | Read-out time (14" × 17" size) |
|---|---|
| 20 | 4 sec |
| 40 | 9 sec |
| 60 | 13 sec |
| 80 | 17 sec |
| 100 | 22 sec |
| 150 | 32 sec |
| 200 | 43 sec |

As indicated in Table 1, such that the read-out time may be at most 20 seconds, the value of $t/s^2$ should be smaller than 80, and should preferably be smaller than 40. Specifically, the formula shown below should be satisfied.

$$t/s^2 < 80 \qquad (2)$$

Also, the formula shown below should preferably be satisfied.

$$t/s^2 < 40 \quad (2')$$

What is claimed is:

1. A radiation image read-out apparatus for scanning a stimulable phosphor sheet, on which a radiation image of an object has been stored, with a laser beam of a predetermined output power, which causes the stimulable phosphor sheet to emit light in proportion to the amount of energy stored thereon during its exposure to radiation, and photoelectrically detecting the emitted light with a predetermined sampling time, wherein a response speed r [sec] of the stimulable phosphor constituting the stimulable phosphor sheet, the laser beam output power p [W], a picture element sizes s [m], and the sampling time t [sec] satisfy Formulas (1), (2), and (3):

$$r/(s \cdot t) < 5{,}000 \quad (1)$$

$$t/s^2 < 80 \quad (2)$$

$$p \cdot t/s^2 > 1 \quad (3)$$

2. An apparatus as defined in claim 1 wherein, in lieu of Formula (1), Formula (1') shown below is satisfied:

$$r/(s \cdot t) < 2{,}500 \quad (1')$$

3. An apparatus as defined in claim 1 wherein, in lieu of Formula (2), Formula (2') shown below is satisfied:

$$t/s^2 < 40 \quad (2')$$

4. An apparatus as defined in claim 1 wherein, in lieu of Formula (3), Formula (3') shown below is satisfied:

$$p \cdot t/s^2 > 2 \quad (3')$$

5. An apparatus as defined in claim 1 wherein the response speed r of the stimulable phosphor is at most $200 \times 10^{-9}$ [sec].

6. An apparatus as defined in claim 1 wherein the stimulable phosphor is a cerium activated phosphor.

* * * * *